United States Patent [19]
He

[11] Patent Number: 6,052,842
[45] Date of Patent: Apr. 25, 2000

[54] WATERLESS CLOSET ASSEMBLY

[76] Inventor: Englong He, No. 10 Dongli, Anwai Xiao Guan, Chaoyang District, Beijing 100029, China

[21] Appl. No.: 09/117,553
[22] PCT Filed: Feb. 2, 1996
[86] PCT No.: PCT/CN96/00009
  § 371 Date: Oct. 5, 1998
  § 102(e) Date: Oct. 5, 1998
[87] PCT Pub. No.: WO97/27795
  PCT Pub. Date: Aug. 7, 1997
[51] Int. Cl.[7] .................................................. A47K 11/00
[52] U.S. Cl. ........................................................... 4/484
[58] Field of Search ............................................... 4/484

[56] References Cited

U.S. PATENT DOCUMENTS

| | | | |
|---|---|---|---|
| 3,619,822 | 11/1971 | Carmichael | 4/484 |
| 3,665,522 | 5/1972 | Backlund et al. | 4/484 |
| 5,884,346 | 3/1999 | Hengl | 4/484 |

Primary Examiner—Robert M. Fetsuga
Attorney, Agent, or Firm—Adams & Wilks

[57] ABSTRACT

A waterless closet assembly comprises a closet having an inlet and an outlet, and a seat member disposed over the inlet of the closet. A tubular film extends over an upper surface of the seat member and downwardly through the closet and through the outlet of the closet. A first container has an inlet and an outlet and is positioned to receive through the inlet thereof the tubular film extending through the outlet of the closet. A sealing mechanism is disposed in the first container for sealing the tubular film into individual waste compartments. A second container has an inlet connected to the outlet of the first container for receiving the individual waste compartments. An advancing mechanism advances the tubular film over the upper surface of the seat member, through the closet, through the outlet of the closet, and through the sealing mechanism to form the individual waste compartments, and advances the individual waste compartments into the container through the inlet thereof.

40 Claims, 3 Drawing Sheets

WATERLESS CLOSET ASSEMBLY

FIELD OF THE INVENTION

The present invention relates to a closet, and particularly relates to a waterless closet that does not need water to flush.

BACKGROUND OF THE INVENTION

The prior art toilet and closet need water to flush. Once there is no water or there is not enough water, it will cause serious environmental pollution. Accordingly, the prior art toilet and closet are not suitable for use in a waterless place, in a place lacking water or in a movable toilet.

To improve the prior art closet, U.S. Pat. No. 4,025,969 disclosed a sanitary closet that may be cleaned automatically without using water. This closet consists of a closet, a transmission case under the closet and a disposal container. There are two guiding wheels located inside the transmission case, which are used to feed downwards and tightly close a plastic hose, each of the wheel may rotate in opposite direction respectively. A tube-shaped plastic hose goes into the upper entrance of the closet from the bottom of an annular seat fixed on the top of the closet, and then through the guiding wheels and the entrance of the disposal container gets into the disposal container. The drawback of the prior art is that the annular seat can not meet the requirements of sanitation and likely causes cross infection among users.

THE SUMMARY OF THE INVENTION

Therefore, the objective of this invention is to provide a waterless closet assembly that needs no water and can meet the requirements of sanitation.

The waterless closet assembly in accordance with the present invention includes a closet having an upper entrance, a lower exit, an annular seat located on the top of the upper entrance, a long tube-shaped plastic hose, and a step-by-step feeding device. One end of the plastic hose is located outside the closet. The other end of the plastic hose goes over the upper surface of the annular seat, passes through the inside of the inlet of the closet and the step-by-step feeding device, and then is fed into the disposal container from its entrance.

After each use of the closet, the step-by-step feeding device feeds the used section of the plastic hose into the disposal container and a new section of the plastic hose is then put on the annular seat to keep the closet clean and to prevent the users from cross infection.

The further merits and details of this invention are given with reference to the accompanying drawings.

DETAILED DESCRIPTION OF THE PREFERRED EMBODIMENT

Figure 1:
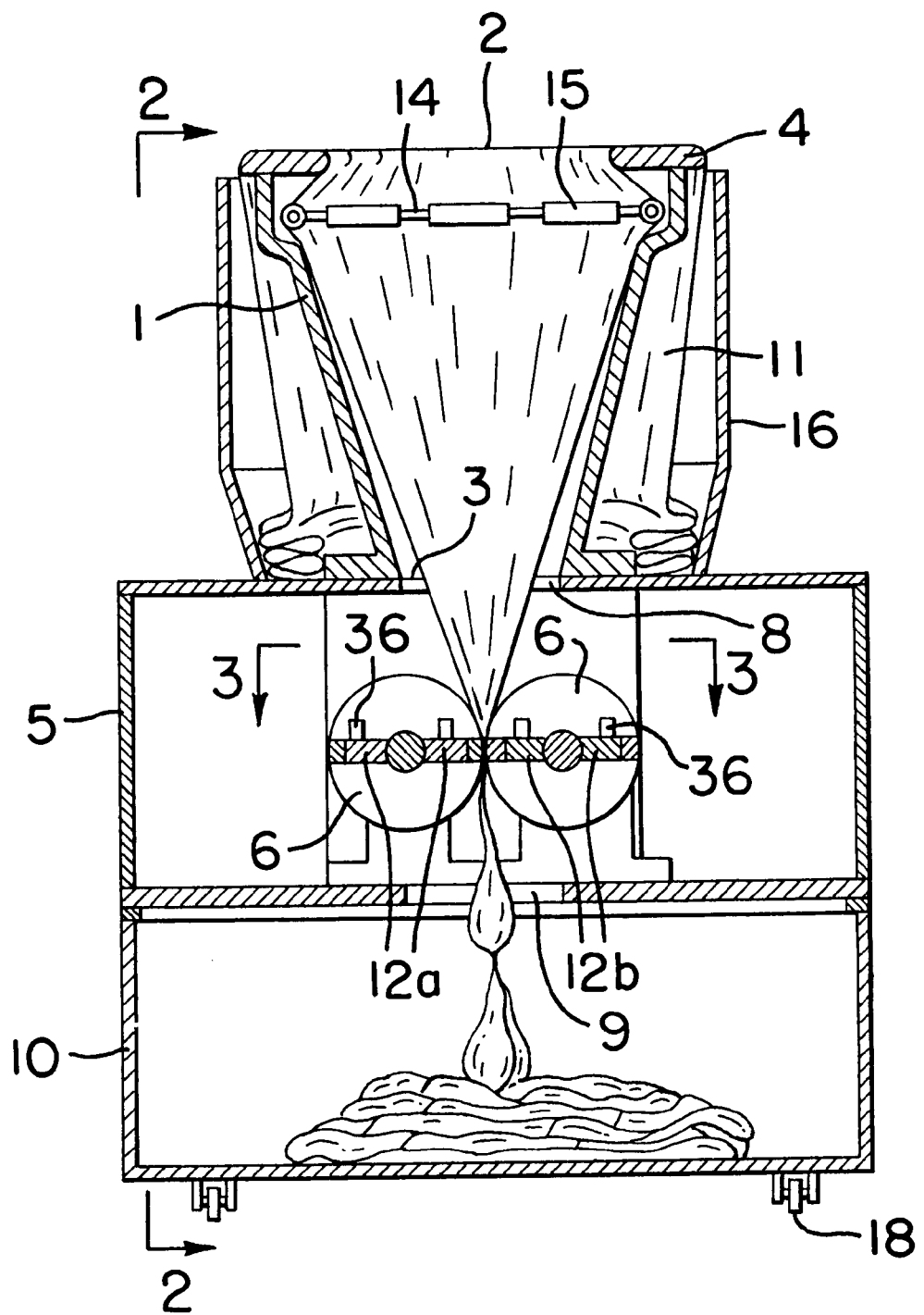
FIG. 1 is a cross-section view of the waterless closet assembly in accordance with this invention.

As shown in FIG. 1, the waterless closet assembly mainly comprises a closet, a step-by-step feeding device and a disposal container.

The closet 1 has an upper entrance or inlet 2, a lower exit or outlet 3 and an annular seat 4 for users fixed on the top of the upper entrance 2.

A step-by-step advancing or feeding device 30 feeding downwards a plastic hose 11 is located in a transmission case 5 under the closet 1. The step-by-step feeding device includes a pair of rollers 6 mounted on supports 23 and a step-by-step driving means. The transmission case 5 has an upper entrance 8 and a lower exit 9.

A disposal container 10 having an upper entrance connected with the lower exit 9 of the transmission case 5 is located under the transmission case 5.

The plastic hose 11 has a long tubular shape and, which can dissolve in nature. The plastic hose 11 has one end is located outside the closet 1 and in a barrel 12 disposed around the closet 1. The other end of the plastic hose 11 goes over the upper surface of the annular seat 4 and goes into the inside of the closet 1 through the upper entrance 2 of the closet 1, into the transmission case 5 from the lower exit 3 of the closet 1, and finally 10 into the disposal container 10 through the rollers 6 and the lower exit 9 of the transmission case 5.

Figure 2:
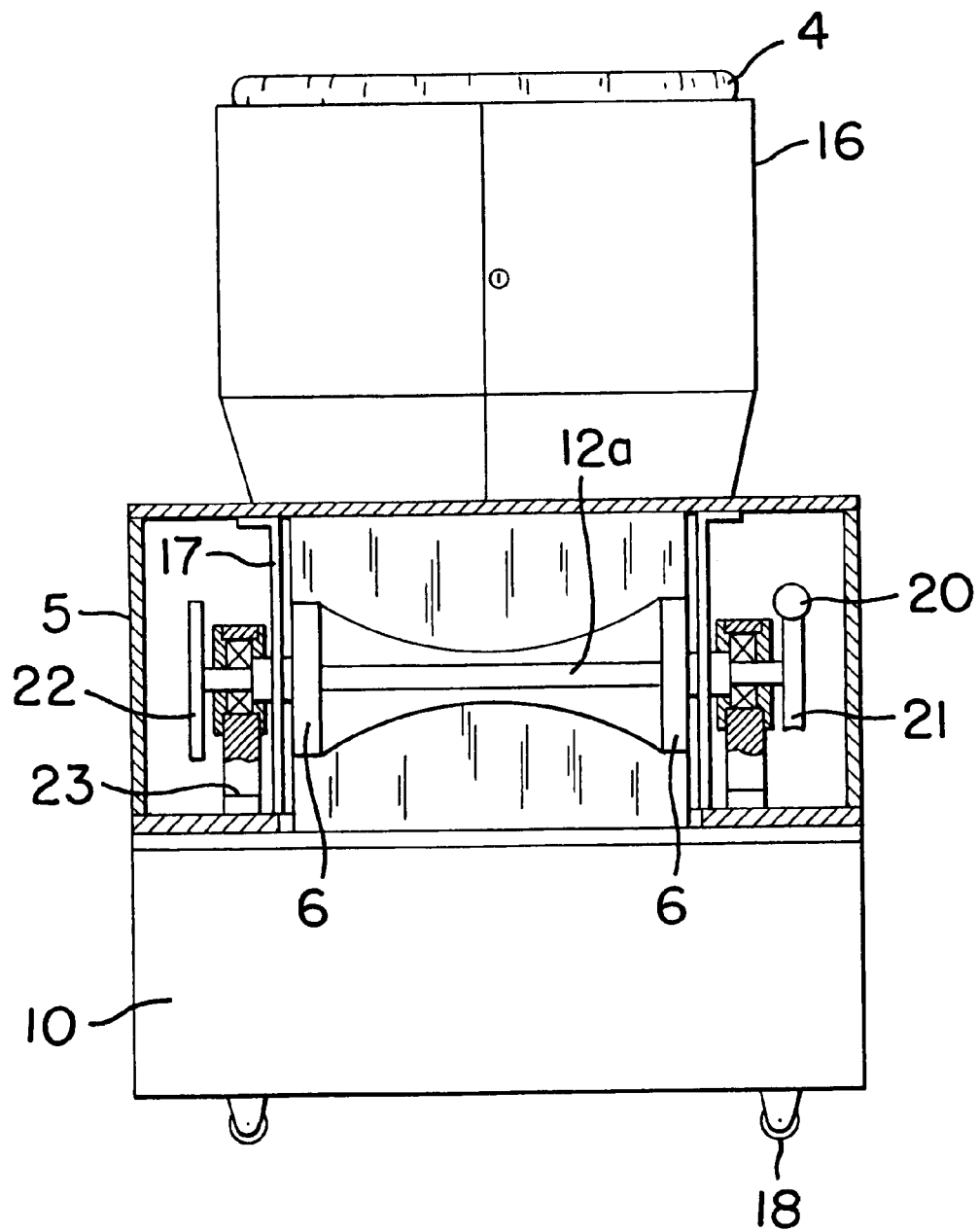
FIG. 2 is a cross-section view taken along 2—2 in FIG. 1.

As shown in FIG. 2, each roller in accordance with this invention is bigger at the two ends and thinner in the middle part. The plastic hose is clamped tightly by the two rollers; accordingly, the plastic hose is pulled downwards when the rollers turn.

Because of the foregoing shape of the rollers, the excrement in the plastic hose easily gathers between the thinner parts of the two rollers under the gravitational force.

Figure 3:
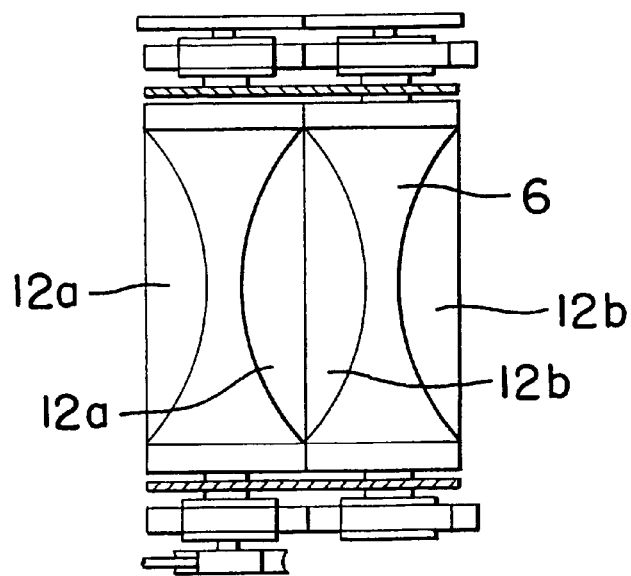
FIG. 3 is a cross-section view taken along 3—3 in FIG. 1.

As shown in FIG. 3, a clamping plate 12a and a clamping plate 12b are fixed on the two rollers respectively. The shape of the two plates are just the reversed one of the two rollers. The outer edges 13 of the clamping plates 12a and 12b clamp the plastic hose 11 passing therethrough.

Figure 4:
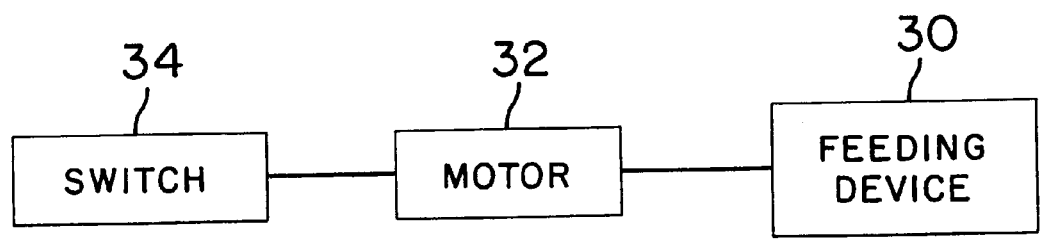
FIG. 4 is a block diagram showing the switch, motor and feeding device of the invention.

As shown in FIGS. 2 and 4, the rollers 6 are driven by a step-by-step feeding device. In accordance with this embodiment of the invention, the step-by-step feeding device includes a worm 20, worm gears 21 and transmission gears 22 and a step-by-step motor (32). The step-by-step motor 32 drives the two rollers 6 to turn a half circle in reverse direction respectively each time. A switch 34 may be fixed in a proper place, such as in the place under the annular seat 4 for activating the step-by-step motor 32. After using the toilet, the user may turn the switch 34 on once. Thus the rollers 6 pull down the plastic hose for a certain length and the section of the plastic hose with excrement will fall into the disposal container, while the clamping plate 12a and the clamping plate 12b turn a half circle respectively and meet together to seal the plastic hose 11.

As shown in FIG. 1, heating devices 36 can be added and fixed on the clamping plate 12a and the clamping plate 12b to seal the opening of the plastic hose. The heating devices 36 can be supplied with electricity in any suitable conventional manner.

Each roller may have one clamping plate, so when the switch of the step-by-step feeding device is turned on, the rollers 6 turn one circle, and complete the action of pulling down and clamping the plastic hose 11.

The step-by-step feeding device may be driven not only by a motor but also by a user stepping on a pedal of the device. The pedal may be connected to the step-by-step feeding device through the intermediary of suitable gearing. An example of a conventional pedal and gearing system for this purpose is disclosed in U.S. Pat. No. 3,665,522 which is incorporated herein by reference.

A sealing plate 17 is fixed in the transmission case 5 so as to keep the rollers 6 mounted in the case and separates the rollers from the step-by-step feeding device.

Wheels 18 are fixed on the bottom of the disposal container so that the whole closet assembly can be moved easily.

As shown in FIG. 1, an expansion ring 14 is located in the closet 1 under the annular seat 4, the plastic hose 11 goes into the closet from its upper entrance and goes downwards passing through the expansion ring 14. The diameter of the expansion ring 14 is bigger than the entrance 2, so the plastic hose 11 can be opened and will not stick together to affect the use of the closet. A bigger plastic hose may be used in order to shorten the distance between the entrance 2 and the rollers 6 so that the closet is not too high. A number of guide wheels 15 can be fixed on the expansion ring 14 to guide the plastic hose 11, which helps the plastic hose go down.

What is claimed is:

1. A waterless closet assembly comprising: a closet having an inlet and an outlet; an annular seat disposed over the inlet of the closet; a tubular hose having a first portion disposed exteriorly of the closet and a second portion extending upwardly over an upper surface of the annular seat and downwardly through the closet and through the outlet of the closet; a first container having an inlet for receiving therethrough the tubular hose; a second container disposed between the closet and the first container, the second container having an inlet connected to the outlet of the closet and an outlet connected to the inlet of the first container; and advancing means disposed in the second container for advancing the hose upwardly over the upper surface of the annular seat and downwardly through the closet, through the second container and into the first container.

2. A waterless closet assembly as claimed in claim 1; wherein the advancing means comprises a pair of rollers disposed side by side for receiving therebetween the tubular hose and mounted for undergoing rotation to pull the tubular hose downwardly, and a stepping motor for rotationally driving the rollers.

3. A waterless closet assembly as claimed in claim 2; wherein each of the rollers has a clamping plate extending radially from a rotational axis of the roller for clamping the tubular hose; wherein when the stepping motor rotates the rollers 360°, the clamping plates cooperate with one another to clamp the tubular hose.

4. A waterless closet assembly as claimed in claim 2; wherein each of the rollers has two clamping plates disposed at an interval of 180° and extending radially from a rotational axis of the roller for clamping the tubular hose; wherein when the stepping motor rotates the rollers 180°, one of the clamping plates of one of the rollers cooperates with another clamping plate of the other roller to clamp the tubular hose.

5. A water closet assembly comprising: a closet having an inlet and an outlet; an annular seat disposed over the inlet of the closet; a tubular hose having a first portion disposed exteriorly of the closet and a second portion extending upwardly over an upper surface of the annular seat, through the closet and through the outlet of the closet; an expansion ring disposed under the annular seat and in the closet for expanding a portion of the tubular hose and having a diameter greater than that of the inlet of the closet, the tubular hose extending downwardly over an outer surface of the expansion ring; a container having an inlet for receiving therethrough the tubular hose; and a moving device for moving the tubular hose upwardly over the upper surface of the annular seat and downwardly over the outer surface of the expansion ring, through the closet and into the container.

6. A waterless closet assembly as claimed in claim 5; wherein the expansion ring has a plurality of guiding wheels for guiding the tubular hose.

7. A waterless closet assembly as claimed in claim 4; further comprising a heating device disposed on each of the clamping plates for heat sealing the tubular hose.

8. A waterless closet assembly as claimed in claim 7; further comprising an enclosure disposed around the closet for storing the first portion of the tubular hose.

9. A waterless closet assembly as claimed in claim 1; further comprising wheels fixed on a lower surface of the first container.

10. A waterless closet assembly as claimed in claim 1; further comprising an electrical motor for driving the advancing means.

11. A waterless closet assembly as claimed in claim 1; further comprising a pedal operable by a user for driving the advancing means.

12. A waterless closet assembly as claimed in claim 1; wherein the tubular hose is comprised of a plastic material.

13. A waterless closet assembly as claimed in claim 5; wherein the tubular hose is comprised of a plastic material.

14. A waterless closet assembly as claimed in claim 5; wherein the driving device comprises a pair of rollers disposed side by side for receiving therebetween the tubular hose and mounted for undergoing rotation to pull the tubular hose downwardly, and a stepping motor for rotationally driving the rollers.

15. A waterless closet assembly as claimed in claim 14; wherein the tubular hose is comprised of a plastic material.

16. A waterless closet assembly as claimed in claim 14; wherein the expansion ring has a plurality of guiding wheels for guiding the tubular hose.

17. A waterless closet assembly as claimed in claim 5; wherein each of the rollers has a clamping plate extending radially from a rotational axis of the roller for clamping the tubular hose; wherein when the stepping motor rotates the rollers 360°, the clamping plates cooperate with one another to clamp the tubular hose.

18. A waterless closet assembly as claimed in claim 17; wherein the tubular hose is comprised of a plastic material.

19. A waterless closet assembly as claimed in claim 17; wherein the expansion ring has a plurality of guiding wheels for guiding the tubular hose.

20. A waterless closet assembly as claimed in claim 5; wherein each of the rollers has two clamping plates disposed at an interval of 180° and extending radially from a rotational axis of the roller for clamping the tubular hose; wherein when the stepping motor rotates the rollers 180°, one of the clamping plates of one of the rollers cooperates with another clamping plate of the other roller to clamp the tubular hose.

21. A waterless closet assembly as claimed in claim 20; wherein the tubular hose is comprised of a plastic material.

22. A waterless closet assembly as claimed in claim 3; further comprising a heating device disposed on each of the clamping plates for heat sealing the plastic hose.

23. A waterless closet assembly as claimed in claim 3; further comprising an enclosure disposed around the closet for storing the first portion of the tubular hose.

24. A waterless closet assembly comprising: a closet having an inlet and an outlet; a seat member disposed over the inlet of the closet; a tubular film extending over an upper surface of the seat member, through the closet and through the outlet of the closet; an expansion member for expanding a portion of the tubular film; sealing means for sealing the tubular film into individual waste compartments; a container having an inlet for receiving therethrough the individual waste compartments; and advancing means for advancing the plastic film over the upper surface of the seat member, through the closet, through the outlet of the closet, and through the sealing means to form the individual waste compartments, and for advancing the individual waste compartments into the container through the inlet thereof.

25. A waterless closet assembly as claimed in claim 24; wherein the expansion member is disposed in the closet.

26. A waterless closet assembly as claimed in claim 25; wherein the expansion member has a diameter greater than that of the inlet of the closet.

27. A waterless closet assembly as claimed in claim 26; wherein the expansion member has a plurality of guiding wheels for guiding the tubular film.

28. A waterless closet assembly as claimed in claim 26; wherein the tubular film extends over an outer surface of the expansion member.

29. A waterless closet assembly as claimed in claim 24; wherein the expansion member has a plurality of guiding wheels for guiding the tubular film.

30. A waterless closet assembly as claimed in claim 24; further comprising an enclosure disposed around the closet for storing the tubular film prior to being advanced by the advancing means.

31. A waterless closet assembly comprising: a closet having an inlet and an outlet; a seat member disposed over the inlet of the closet; a tubular film extending over an upper surface of the seat member and downwardly through the closet and through the outlet of the closet; a first container having an inlet and an outlet, the first container being positioned to receive through the inlet thereof the tubular film extending through the outlet of the closet; sealing means disposed in the first container for sealing the tubular film into individual waste compartments; a second container having an inlet connected to the outlet of the first container for receiving the individual waste compartments; and advancing means for advancing the tubular film over the upper surface of the seat member, through the closet, through the outlet of the closet, and through the sealing means to form the individual waste compartments, and for advancing the individual waste compartments into the container through the inlet thereof.

32. A waterless closet assembly as claimed in claim 31; wherein the sealing means comprises a pair of rollers disposed side by side in the first container for receiving therebetween the tubular film passing through the inlet of the first container, and a plurality of heating elements disposed on the rollers for heat sealing the tubular film to form the individual waste compartments.

33. A waterless closet assembly as claimed in claim 32; wherein the advancing means includes means for rotating the rollers to advance the plastic film through the rollers and the heating elements to form the individual waste compartments, and for advancing the individual waste compartments into the second container through the inlet thereof.

34. A waterless closet assembly as claimed in claim 32; further comprising an expansion member for expanding a portion of the tubular film.

35. A waterless closet assembly as claimed in claim 34; wherein the expansion member is disposed in the closet.

36. A waterless closet assembly as claimed in claim 35; wherein the expansion member has a diameter greater than that of the inlet of the closet.

37. A waterless closet assembly as claimed in claim 36; wherein the expansion member has a plurality of guiding wheels for guiding the tubular film.

38. A waterless closet assembly as claimed in claim 36; wherein the tubular film extends over an outer surface of the expansion member.

39. A waterless closet assembly as claimed in claim 34; wherein the expansion member has a plurality of guiding wheels for guiding the tubular film.

40. A waterless closet assembly as claimed in claim 31; further comprising an enclosure disposed around the closet for storing the tubular film prior to being advanced by the advancing means.

* * * * *